Feb. 14, 1956  N. F. SCHUH, JR  2,735,039
OVERVOLTAGE PROTECTION FOR ALTERNATING CURRENT GENERATORS
Filed Nov. 22, 1952
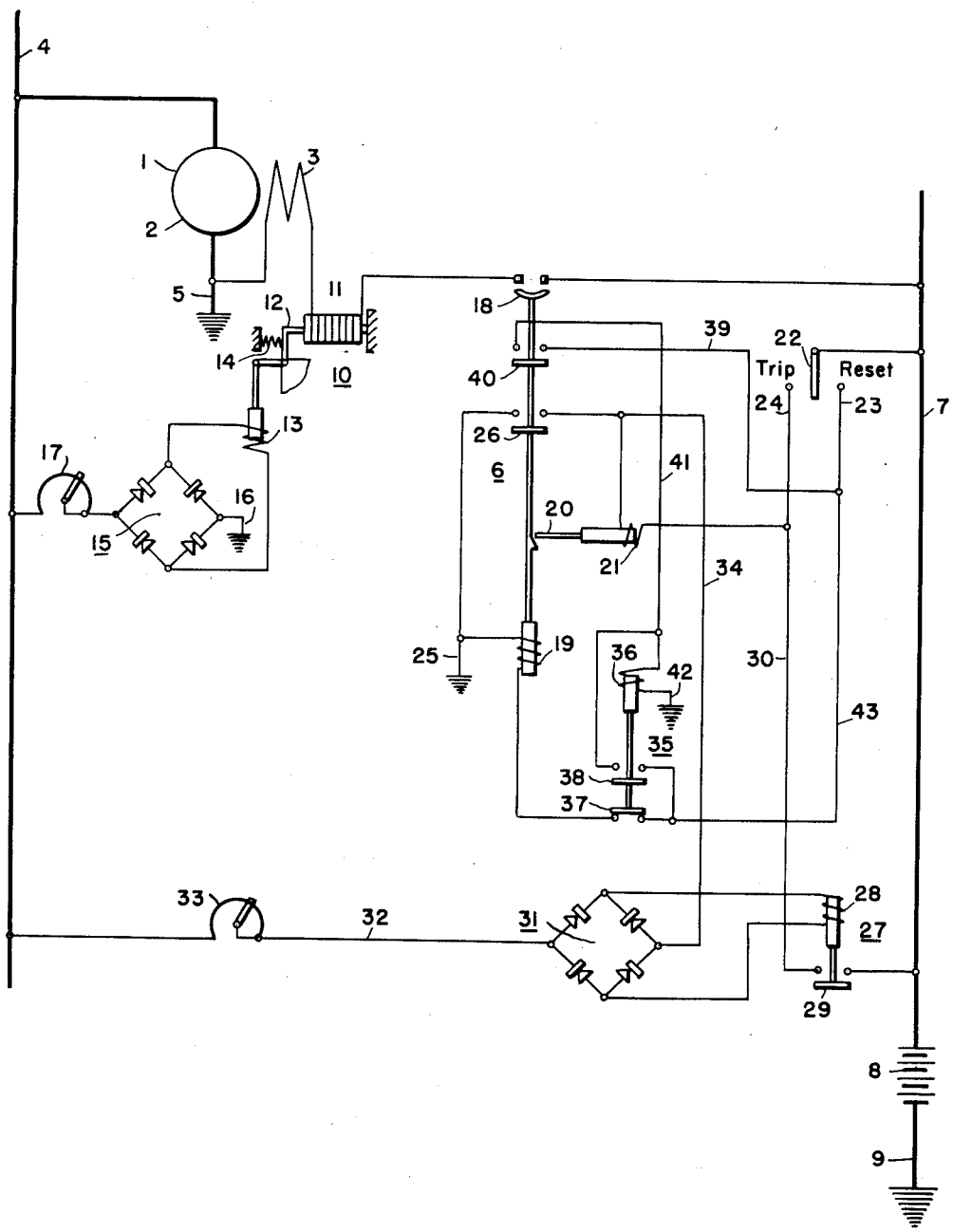
WITNESSES:
E. A. McCloskey.
Leon J. Taza
INVENTOR
Niles F. Schuh, Jr.
BY
F. P. Lyle
ATTORNEY

United States Patent Office 2,735,039
Patented Feb. 14, 1956

2,735,039

OVERVOLTAGE PROTECTION FOR ALTERNATING CURRENT GENERATORS

Niles F. Schuh, Jr., Lima, Ohio, assignor to Westinghouse Electric Corporation, East Pittsburgh, Pa., a corporation of Pennsylvania Application November 22, 1952, Serial No. 322,059

5 Claims. (Cl. 317—13)

The present invention relates to the control and protection of alternating-current generators and, more particularly, to a control circuit for providing overvoltage protection for such generators.

While the usefulness of the present invention is not restricted to any specific type of generator, it is especially suitable for providing overvoltage protection for alternating-current generators intended for operation over a wide speed range, such as are used in variable-frequency alternating-current aircraft electrical systems. Such systems are often used on aircraft for supplying loads which are not affected by frequency variation, such as heating and lighting loads, since aircraft generators are usually driven from a main engine of the airplane and the use of a variable-frequency system permits elimination of the constant-speed drive which is required for a constant-frequency system, thus making possible a considerable saving in weight.

Protection against abnormal conditions is, of course, necessary in such systems, and one of the most serious abnormal conditions is overvoltage of the generator, which may be very damaging both to the generator itself and to the loads connected to the system. In providing overvoltage protection for wide-speed-range generators, however, there are certain problems which are not encountered, or which are less serious, in other types of machines. One such problem is that machines of this type usually have a relatively high residual voltage, which may be greater than 50% of the normal rated voltage. That is, when the machine is running at high speed with no field excitation, the generated voltage due to the residual magnetic flux of the magnetic circuit may be more than 50% of the normal rated voltage. Overvoltage protective relays, such as are usually used for overvoltage protection, are normally designed to have a relatively low dropout voltage, so that when such relays are utilized in the usual manner with a machine having such a high residual voltage, the relay may be held in its actuated position by the residual voltage after it has once operated. This would make it impossible to restore the machine to service after an overvoltage condition has occurred, unless the machine is actually brought to rest to allow the relay to drop out, which is usually impractical in the case of aircraft generators since they are directly driven by a main engine of the airplane. Thus, the protective system must provide for positive dropout of the relay after operation. Another requirement for protection of aircraft alternators is that the operation of the protective means must be trip-free, that is, after it has operated to remove field excitation from the generator it must not be possible for the field to be again energized until the operator has manually reset the system.

The principal object of the present invention is to provide a control and protective system for an alternating-current generator in which an overvoltage relay is utilized for effecting deenergization of the generator field winding in response to overvoltage, and in which the relay positively drops out after operation, regardless of the value of the residual voltage of the generator.

Another object of the invention is to provide a control and protective system for alternating-current generators in which the generator field winding is deenergized in response to overvoltage of the generator, and which is trip-free in operation, so that the generator field winding cannot again be energized after operation until the system has been manually reset.

More specifically, the invention provides a control and protective system for alternating-current generators in which the generator field winding is controlled by a latched type field relay, and in which an overvoltage relay is provided which effects tripping of the field relay to deenergize the generator field winding in response to overvoltage of the generator. The field relay has auxiliary contacts which interrupt the sensing circuit of the overvoltage relay when the field relay opens, so that the overvoltage relay positively drops out after operation. A lockout relay is also provided, which is controlled by another auxiliary contact on the field relay, and which controls the energizing circuit of the field relay closing coil so that even if the switch which controls the closing coil is held closed, the field relay cannot reclose after an operation until the switch has been manually operated to reset the system.

Other objects and advantages of the invention will be apparent from the following detailed description, taken in connection with the accompanying drawing, the single figure of which is a schematic diagram showing an illustrative embodiment of the invention.

The invention is shown in the drawing embodied in a control and protective system for an alternating-current generator 1. The generator 1 is shown as a single-phase generator having an armature member 2 and a field winding 3. One terminal of the armature 2 is connected to a load bus 4 and the other terminal is connected to ground at 5. One terminal of the field winding 3 is connected to a suitable source of direct-current excitation by means of a field relay 6, and the other terminal is connected to ground, preferably also at 5. The system is shown as utilizing a ground return for both the alternating and direct current circuits, since this is preferable for aircraft systems because of the saving in weight, but it will be apparent that separate wire return circuits might be used, if desired. In the illustrated embodiment of the invention, direct-current excitation for the field winding 3 is provided from a direct-current bus 7, which may be supplied from any suitable source of direct current, shown diagrammatically as a battery 8, one terminal of which is connected to the bus 7 and the other terminal to ground at 9. While the invention is shown applied to a single-phase generator excited from a direct-current bus, it will be apparent that it is not limited to this particular type of generator system, but may be applied to any type of alternating-current generator with any suitable source of excitation.

The output voltage of the generator 1 is controlled by a voltage regulator 10, which is shown as a carbon pile regulator having a carbon pile 11 connected in series with the field winding 3 to control the field current. The resistance of the carbon pile 11 is varied by varying the pressure applied to it by a pressure mechanism 12 of any suitable type, which is controlled by a coil 13 acting in opposition to a spring 14. The coil 13 is energized in response to the voltage of the generator 1, and is shown as being energized through a single-phase rectifier bridge 15 connected across the generator voltage between the load bus 4 and ground 16. A voltage adjusting rheostat 17 is preferably connected in series with the rectifier 15 to adjust the generator voltage.

As indicated above, the circuit of the field winding 3 is controlled by the field relay 6, which has main contacts 18 connected in series with the field winding to control the connection of the field winding to the direct-current bus 7. The field relay 6 is a relay of the latching type having a closing coil 19 and a latch mechanism 20 which latches the relay in closed position. The latch mechanism 20 is released by a trip coil 21 to permit the relay 6 to open.

The field relay 6 is controlled by a manual switch 22, which is connected directly to the direct-current bus 7 and which has a reset contact 23 and a trip contact 24. The switch 22 may be a momentary contact type of switch, or it may be of any other desired type, and has a central off position, as shown in the drawing. The reset contact 23 is connected to the closing coil 19, the other end of which is connected to ground at 25, so that the relay 6 is caused to close its contacts when the switch 22 is placed on the contact 23. The trip contact 24 is connected to the trip coil 21, the other end of which is connected to ground at 25 through an auxiliary contact 26 on the field relay, which is closed when the relay is closed. Thus, the relay is tripped when the switch 22 is placed on the trip contact 24 and the circuit of the trip coil is interrupted as soon as the relay 6 opens, thus preventing possible damage to the coil 21 if the switch 22 should be held on the trip contact for any length of time, since the coils of relays of this type are usually designed for momentary excitation only.

Overvoltage protection for the generator 1 is provided by an overvoltage relay 27 having an operating coil 28 and a normally open contact 29. The relay 27 preferably has inverse time delay characteristics to obtain faster operation on higher overvoltages, but it may be of any suitable type. The contact 29 of the relay 27 is connected between the bus 7 and the trip coil 21 by a conductor 30, so that when the relay closes its contact, the field relay 6 is immediately tripped. The coil 28 of the relay 27 is energized in response to the voltage of the generator 1 through a rectifier bridge 31. The rectifier bridge 31 is connected to one side of the generator 1 by means of a conductor 32, in series with a voltage adjusting rheostat 33, and is connected to ground 25 by means of a conductor 34 through the auxiliary contact 26 of the field relay 6. Thus, the sensing circuit of the relay 27 is controlled by the field relay 6 and is interrupted when the field relay opens.

Trip-free operation of the system is obtained by means of a lockout relay 35 which has an operating coil 36, a normally closed contact 37 and a normally open contact 38. The contact 37 is connected in series with the closing coil 19 of the field relay 6 so as to interrupt the circuit of the closing coil when the relay 35 operates. The coil 36 of the relay 35 is connected to the reset contact 23 by means of a conductor 39, an auxiliary contact 40 on the field relay 6 and a conductor 41, the other end of the coil 36 being connected to ground at 42. The auxiliary contact 40 is open when the field relay 6 is open, so that the relay 35 is energized when the field relay closes if the switch 22 is on the reset contact 23. The contact 38 of the lockout relay 35 is connected as shown to provide a sealing circuit for holding the relay in after the field relay 6 has opened.

The operation of this system is as follows. The drawing shows all the relays in their deenergized positions. If the generator 1 is running at its normal speed, and it is desired to bring the generator up to voltage for normal operation, the field circuit is closed by placing the switch 22 on the reset contact 23. This completes a circuit from the direct-current bus 7 through the normally closed contact 37 of the lockout relay 35 to the closing coil 19, and causes the relay 6 to close its main contact 18 to connect the generator field winding 3 to the bus 7 to apply field excitation to the generator. The auxiliary contacts 26 and 40 also close so that the coil 28 of the overvoltage relay 27 is connected across the generator voltage through the contact 26. The coil 36 of the lockout relay 35 is connected to the reset contact 23 through the auxiliary contact 40, and if the switch 22 is left on the contact 23, the lockout relay 35 opens its contact 37. This has no effect at this time, however, since the field relay 6 is latched in closed position by the latch mechanism 20. The system is now in its normal condition with the generator 1 operating and delivering its normal voltage under control of the voltage regulator 10.

If for any reason the generator voltage exceeds the predetermined maximum value for which the overvoltage relay 27 is set, the relay will close its contact 29, connecting the trip coil 21 to the bus 7 so that the field relay 6 is tripped and opens its contacts, deenergizing the generator field winding 3. The auxiliary contact 26 of the field relay 6 also opens and interrupts the sensing circuit of the overvoltage relay 27 so that the relay immediately drops out. In this way, positive dropout of the relay 27 is assured, and there is no possibility of its being held in by the residual voltage of the generator.

As indicated above, if the manual switch 22 is held on the reset contact 23, or allowed to remain on that contact when the field relay 6 closes, the lockout relay 35 is energized and opens its contact 37 and closes its contact 38. If an overvoltage condition occurs under these circumstances, the field relay 6 will be tripped as described above, but even though the switch 22 is still on the reset contact 23, the field relay 6 will not attempt to reclose because the circuit of the closing coil 19 is interrupted by the contact 37 of the lockout relay. The contact 38 provides a circuit directly from the reset contact 23 through the conductor 43, so that the lockout relay 35 is maintained energized after the field relay 6 opens as long as the switch 22 is on the reset contact. Thus, the system is trip-free since the field relay 6 cannot be reclosed after operation, under any conditions, until the switch 22 has been returned to its normal off position to deenergize the lockout relay 35 and then again placed on the reset contact 23 to energize the closing coil 19. It will be seen, therefore, that the relay 6 cannot pump under any conditions, since if the switch 22 is in its off position the coil 19 is not energized, and if for any reason the switch should be on the reset contact, the lockout relay 35 will prevent energization of the closing coil until the system has been manually reset by operation of the switch 22.

It should now be apparent that a control and protective system for alternating-current generators has been provided which provides positive dropout of the overvoltage relay and trip-free operation under all conditions. This result is obtained with a minimum number of circuit elements and contacts, resulting in a simple and compact system which is very suitable for aircraft use. The field relay requires only two auxiliary contacts, which may be very light contacts since they are required to interrupt only small control currents, and thus the relay may be a relatively simple and inexpensive device. The lockout relay has a very light duty so that a small, lightweight relay can be utilized. Thus, a very desirable and simple system is provided which accomplishes the desired results in a highly reliable manner.

As previously indicated, the control system may be applied to any type of alternating-current generator, with any source of excitation, and although a particular arrangement of the system has been shown and described for the purpose of illustration, it will be evident that various modifications and other embodiments are possible within the scope of the invention. It is to be understood, therefore, that the invention is not restricted to the specific arrangement shown, but in its broadest aspects, it includes all equivalent modifications and embodiments.

I claim as my invention:

1. A control system for an alternating-current generator having a field winding, said control system including a field relay for controlling the connection of said field winding to a source of direct current, means for actuating said field relay to closed position to effect connection of the field winding to said source, the field relay having latch means for holding it in closed position and trip means for releasing the latch means, a voltage relay, and contact means on the field relay for connecting the voltage relay to be responsive to the generator voltage when the field relay is in closed position, the voltage relay being connected to effect energization of said trip means in response to a predetermined generator voltage to cause opening of the field relay.

2. A control system for an alternating-current generator having a field winding, said control system including a field relay for controlling the connection of said field winding to a source of direct current, means for actuating said field relay to closed position to effect connection of the field winding to said source, the field relay having latch means for holding it in closed position and trip means for releasing the latch means, a voltage relay having an operating coil connected to be responsive to the generator voltage and having contacts connected to effect energization of said trip means when the generator voltage exceeds a predetermined value to cause opening of the field relay, and means for effecting deenergization of the operating coil of the voltage relay when the field relay opens.

3. A control system for an alternating-current generator having a field winding, said control system including a field relay for controlling the connection of said field winding to a source of direct current, means for actuating said field relay to closed position to effect connection of the field winding to said source, the field relay having latch means for holding it in closed position and trip means for releasing the latch means, a voltage relay having an operating coil connected to be responsive to the generator voltage and having contacts connected to effect energization of said trip means when the generator voltage exceeds a predetermined value to cause opening of the field relay, and contact means on the field relay connected in the circuit of said operating coil to effect deenergization of the operating coil when the field relay opens.

4. A control system for an alternating-current generator having a field winding, said control system including a field relay for controlling the connection of said field winding to a source of direct current, said field relay having a closing coil for actuating the relay to closed position to effect connection of the field winding to said source, the field relay having latch means for holding it in closed position and trip means for releasing the latch means, switch means for effecting energization of said closing coil, a voltage relay having an operating coil and having contacts connected to control the energization of said trip means, first contact means on the field relay for connecting said operating coil to be responsive to the generator voltage when the field relay is in closed position, the voltage relay effecting energization of the trip means to cause opening of the field relay when the generator voltage exceeds a predetermined value, a lockout relay having an operating coil and having contacts connected in the circuit of the closing coil of the field relay, and second contact means on the field relay connected to complete an energizing circuit for the operating coil of the lockout relay through the switch means when the field relay is in closed position, the lockout relay opening its contacts to interrupt the circuit of the holding coil when its operating coil is energized.

5. A control system for an alternating-current generator having a field winding, said control system including a field relay for controlling the connection of said field winding to a source of direct current, said field relay having a closing coil for actuating the relay to closed position to effect connection of the field winding to said source, the field relay having latch means for holding it in closed position and trip means for releasing the latch means, switch means for effecting energization of said closing coil, a voltage relay having an operating coil and having contacts connected to control the energization of said trip means, first contact means on the field relay for connecting said operating coil to be responsive to the generator voltage when the field relay is in closed position, the voltage relay effecting energization of the trip means to cause opening of the field relay when the generator voltage exceeds a predetermined value, a lockout relay having an operating coil and having contacts connected in the circuit of the closing coil of the field relay, second contact means on the field relay connected to complete an energizing circuit for the operating coil of the lockout relay through the switch means when the field relay is in closed position, the lockout relay opening its contacts to interrupt the circuit of the holding coil when its operating coil is energized, and means for causing the lockout relay to hold its contacts open as long as the switch means is in position to energize the closing coil.

References Cited in the file of this patent

UNITED STATES PATENTS

| | | |
|---|---|---|
| 1,017,060 | Moss et al. | Feb. 13, 1912 |
| 1,180,751 | Wolff | Apr. 25, 1916 |
| 1,344,759 | Fortescue | June 29, 1920 |
| 1,906,817 | Seeley | May 2, 1933 |
| 2,380,802 | Strang | July 31, 1945 |
| 2,534,895 | Austen et al. | Dec. 19, 1950 |
| 2,550,496 | Reifschneider | Apr. 24, 1951 |
| 2,689,316 | Gillespie | Sept. 14, 1954 |